Dec. 28, 1943.　　　R. B. KAROFF　　　2,337,998
METHOD OF APPLYING PERMANENT COVERS TO BOTTLES
Filed July 13, 1943

INVENTOR
Robert B. Karoff
BY
Harry Ernest Rubens
ATTORNEY

Patented Dec. 28, 1943

2,337,998

UNITED STATES PATENT OFFICE 2,337,998

METHOD OF APPLYING PERMANENT COVERS TO BOTTLES

Robert B. Karoff, New York, N. Y.

Application July 13, 1943, Serial No. 494,471

2 Claims. (Cl. 18—59)

My invention relates to a novel method of applying a permanent cover to a bottle for the purpose of changing its outer shape.

War-time restrictions on the manufacture of moulds have severely limited the number of shapes of glass containers which consumers can expect.

An object of my invention therefore is to provide unusual shapes for covered glass containers, despite the seeming restrictions on their manufacture.

Another object is to utilize large stocks of unused bottles, which for various reasons can no longer be sold for anything approaching their actual cost.

Other objects are to cover bottles with composition in a manner which will create the illusion of being made entirely of glass; and to accomplish the foregoing objects by a method which will not be expensive and which is capable of mass production.

I accomplish these and other objects and obtain my new results as will be apparent from the device described in the following description, particularly pointed out in the claims, and illustrated in the accompanying drawing in which:

Figure 1:
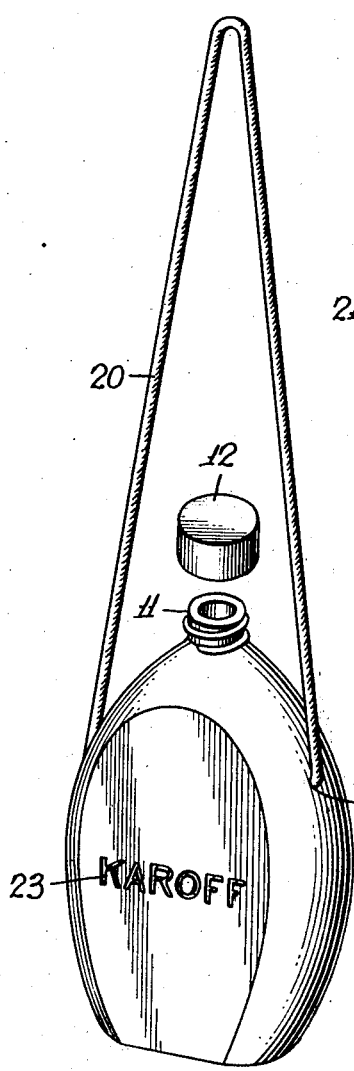
Fig. 1 is a perspective view of my new covered container employing one of many possible designs.
Figure 2:
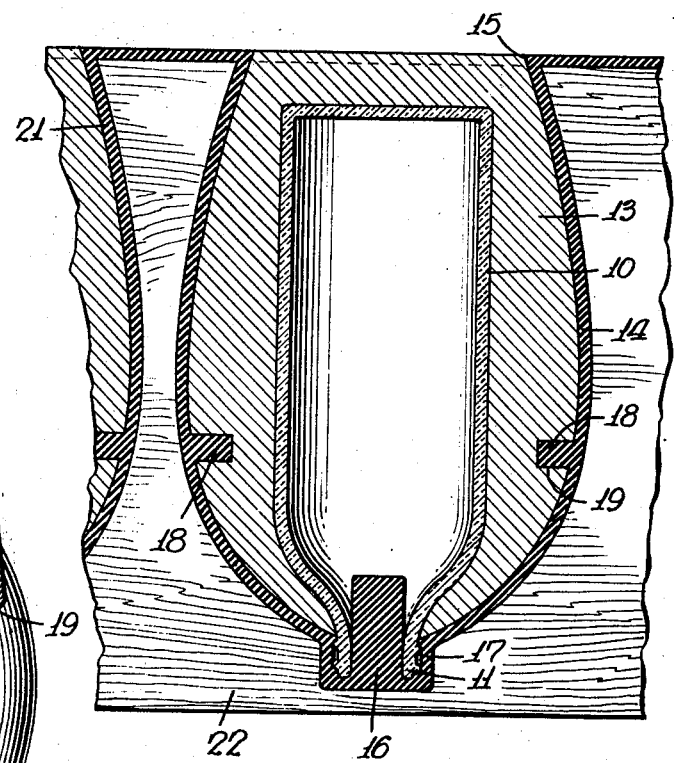
Fig. 2 is a sectional view of my new covered container and rubber mould therefor which illustrates the method of manufacturing the same.

Reference numeral 10 designates a glass bottle having a neck 11, and a cap 12 in threaded engagement therewith.

The glass bottle is provided with a composition coating 13 completely altering its shape, except for the extending threaded neck 11 which is uncovered.

A rubber mould 14 is provided for reshaping the bottle into the desired shape. It contains the opening 15 through which the composition 13 is inserted, preferably plaster.

A plug 16 extends from the bottom of the rubber mould which prevents the plaster from entering the neck of the bottle. It is a further aid in seating the bottle in the mould and holding it in upright position while the plaster is being inserted.

The neck 17 of the mould 14 closely fits the neck 11 of the bottle to prevent the plaster from attaching itself to the threads, of the neck. Thus the original cap 12 for the bottle may be used in its new shape.

The rubber mould 14 may be provided with additional plugs 18 creating recesses 19 in the two sides of the reshaped bottle; for the insertion of the cord handle 20, shown in Fig. 1, which may be cemented or otherwise secured within the recesses. Any suitable means may be incorporated into the rubber mould for providing attachment means for supporting the bottle.

When the composition or plaster has hardened, the rubber mould is stretched enabling the composition covered bottle to be removed. The container may be sprayed or dipped or otherwise finished as desired.

The mould 14 may be one of many integral units such as 21, for reducing the manufacturing costs.

A rigid form 22 may be used to keep the rubber from expanding under the pressure of the plaster composition and distorting the desired shape.

The inside surface of the rubber mould may be provided with protruding or recessed letters or designs which will appear on the finished product. Thus the recessed letters 23 may be formed in the finished product, shown in Fig. 1, which recessed letters may be filled with a composition of wax and talcum, or other filling, and the surface brushed clean to provide inexpensive contrasting markings.

By my method, I can take a bottle having a high center of gravity sufficient to make the bottle unstable on its base, and lower the center of gravity to a point where it cannot be easily upset.

Additionally the bottle may be made less subject to breakage by the composition cover, and provided with handle means, not found in the glass.

The glass neck protruding from the reshaped container creates the illusion that the entire composition covering is actually made of glass. This is a factor in selling such reshaped containers filled with perfume and other liquids requiring glass linings.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

I claim:

1. The method of coating a bottle having a cylindrical extending neck section, with a permanent composition cover which comprises elastically securing the neck of the bottle in the mould to prevent the composition from being attached thereto, filling the space between the mould and the body of the bottle with a composition capable of hardening, and thereafter removing the mould from the bottle leaving only the extending neck uncovered.

2. The method of coating a bottle having a cylindrical extending neck section, with a permanent composition cover which comprises tightly securing the neck of the bottle in an elastic mould to prevent the composition from being attached thereto, filling the space between the mould and the body of the bottle with a composition capable of hardening, and thereafter removing the mould from the bottle leaving only the extending neck uncovered.

ROBERT B. KAROFF.